United States Patent [19]

Usuki et al.

[11] Patent Number: 5,405,689
[45] Date of Patent: Apr. 11, 1995

[54] MAGNETIC RECORDING MEDIUM

[75] Inventors: Kazuyuki Usuki; Tadashi Yasunaga, both of Kanagawa, Japan

[73] Assignee: Fuji Photo Film Co., Ltd., Kanagawa, Japan

[21] Appl. No.: 56,883

[22] Filed: May 5, 1993

[30] Foreign Application Priority Data

May 8, 1992 [JP] Japan .................... 4-142011

[51] Int. Cl.⁶ ............................................. G11B 5/00
[52] U.S. Cl. ............................. 428/323; 428/3311; 428/332; 428/336; 428/421; 428/480; 428/694 B; 428/694 BP; 428/694 BF; 428/694 BS; 428/694 BN; 428/900
[58] Field of Search ....... 428/694 B, 694 BP, 694 BF, 428/694 BS, 694 BN, 480, 900, 421, 332, 336, 323, 331

[56] References Cited

U.S. PATENT DOCUMENTS

| | | | |
|---|---|---|---|
| 4,504,542 | 3/1985 | Miyoshi et al. | 428/336 |
| 4,686,149 | 8/1987 | Aonume et al. | 428/522 |
| 4,863,793 | 9/1989 | Ogawa et al. | 428/323 |

FOREIGN PATENT DOCUMENTS

| | | | |
|---|---|---|---|
| 59-30231 | 2/1984 | Japan | G11B 5/66 |
| 60-69816 | 4/1985 | Japan | B11B 5/66 |
| 61-13427 | 1/1986 | Japan | G11B 5/66 |
| 61-13428 | 1/1986 | Japan | G11B 5/66 |
| 61-168123 | 7/1986 | Japan | G11B 5/704 |

*Primary Examiner*—Paul J. Thibodeau
*Assistant Examiner*—Leszek Kiliman
*Attorney, Agent, or Firm*—Sughrue, Mion, Zinn, Macpeak & Seas

[57] ABSTRACT

A magnetic recording medium is disclosed, comprising a non-magnetic support having an undercoating layer provided on said non-magnetic support and a magnetic layer provided on said undercoating layer, wherein said undercoating layer provided between said non-magnetic support and said magnetic layer comprises mainly a non-magnetic fine particles having an average particle size of 100 to 350 Å and a binder; said binder is a polyester resin having a glass transition temperature (Tg) of 40° C. or less, said undercoating layer has a thickness of 30 to 250 Å; and said magnetic layer is a ferromagnetic metal thin film.

17 Claims, 1 Drawing Sheet

MAGNETIC RECORDING MEDIUM

FIELD OF THE INVENTION

The present invention relates to a ferromagnetic metal thin film type magnetic recording medium, more particularly, to a magnetic recording medium having excellent running durability.

BACKGROUND OF THE INVENTION

The metal thin film type magnetic recording tape has poor running durability as compared with that of the coating type magnetic recording tape. Various improvements have therefore been attempted. In particular, the surface shape of magnetic recording medium is a very important factor for increasing running durability. It is generally controlled by the surface shape of the support thereof or the undercoating layer formed on the support. The undercoating layer is formed by coating on a support a solution containing a mixture of fine particles, a binder, additives, a solvent and so on. Various materials and formation methods for the undercoating layer have been proposed, e.g., in (1) JP-A-59-30231 (the term "JP-A" as used herein means an "unexamined published Japanese patent application"), (2) JP-A-60-69816, (3) JP-A-61-168123, (4) JP-A-61-13427, and (5) JP-A-61-13428.

The above references (1), (2) and (3) relate to polymer particles used as non-magnetic particles of the undercoating layer, and references (4) and (5) aim at securing good contact between a magnetic recording tape and a magnetic head, by using a binder having a glass transition temperature lower than room temperature in the undercoating layer to inhibit curing of the magnetic recording tape.

Most of those proposals are concerned with the material of fine particles and the height and density of projections (i.e., protrusions) formed by fine particles, and the evaluation thereof is confined to the friction coefficient of a magnetic recording tape against a stainless guide pole and still durability. In actual running tests, however, head clogging, head-staining and jitter phenomena often occur because most of the fine particles hitherto proposed have insufficient effects on such problems. On the other hand, there were few reports on the effects of binders in the undercoating layer. Though binders having a Tg lower than room temperature were used in the foregoing references (4) and (5), their effect on running durability was not disclosed therein. Additionally, surface properties deteriorated when a binder having a Tg lower than room temperature was used in a magnetic recording medium having ordinary surface roughness. This is true because the surface of the undercoating layer suffers fine variation in shape under the influence of the back side of the support when the support is rolled up after coating of the undercoating layer.

Moreover, the ferromagnetic metal thin film type magnetic recording medium suffers from the defect that the ferromagnetic metal thin film thereof is easily cracked because of its tendency to have weak resistance against deformation, particularly instantaneous deformation. Therefore, an effective means to realize the compatibility of still durability with tape-running durability has been needed.

SUMMARY OF THE INVENTION

An object of the present invention is to prevent a ferromagnetic metal thin film in the magnetic recording medium from suffering from blocking and cracking phenomena, thereby providing a magnetic recording medium having excellent running property and durability.

This and other objects of the present invention are attained with a magnetic recording medium comprising a non-magnetic support having an undercoating layer provided on the non-magnetic support and a magnetic layer provided on the undercoating layer, wherein the undercoating layer provided between the non-magnetic support and the magnetic layer comprises mainly a non-magnetic fine particles having an average particle size of 100 to 350 Å and a binder, the binder is a polyester resin having a glass transition temperature (Tg) of 40° C. or less, the undercoating layer has a thickness of 30 to 250 Å, and the magnetic layer is a ferromagnetic thin film.

That is, a characteristic of the present invention is to provide the specific undercoating layer in the ferromagnetic metal thin film type magnetic recording medium.

That is, an improvement in the mechanical characteristics of the magnetic recording medium is effected by using a specific binder and filler constituting the undercoating layer, thereby achieving enhancement of running durability.

More specifically, in the present invention a polyester resin having Tg of 40° C. or less is used as the binder of an undercoating layer, and non-magnetic fine particles having an average size of 100 to 350 Å is used as the filler thereof. As a result, the adhesion of the undercoating layer to the magnetic layer is increased and thereby the breaking strength of the magnetic layer is increased. Further, the dynamic load imposed on the magnetic layer by deformation, particularly instantaneous deformation, due to externally applied force is lightened to prevent the generation of cracks and the like. Additionally, the undercoating layer which imparts proper surface roughness to the ferromagnetic metal thin film (i.e., a magnetic layer) can be provided to obtain excellent running durability.

In addition, the present invention reduces the thickness of a magnetic recording medium through reduction in thickness of the undercoating layer. It thereby avoids the detrimental influence of conventional thick undercoating layers, that is, the so-called blocking problem of undercoating layers. The term "blocking problem" as used herein means a problem arising from the phenomenon that when a non-magnetic support coated with an undercoating layer and then rolled up is stored, the surface of the undercoating layer varies minutely in shape because of the influence of the back surface of the support which is in immediate contact therewith resulting in deterioration of surface properties, which causes deterioration of the surface properties of a metal thin film evaporated thereonto.

DETAILED DESCRIPTION OF THE INVENTION

Figure 1:
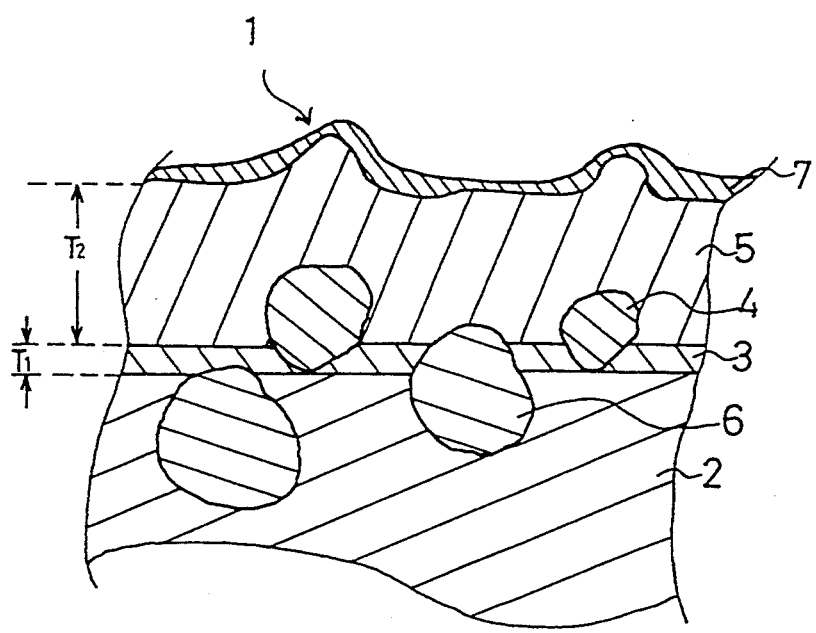
FIG. 1 is a schematically enlarged vertical sectional view of a magnetic recording medium prepared in accordance with an embodiment of the present invention. Therein, the numeral 1 designates the magnetic recording medium of the present invention, the numeral 2 a PET support, the numeral 3 a polyester resin, the numeral 4 spherical silica fine particles, the numeral 5 a ferromagnetic metal thin film, the numeral 6 a filler, and the numeral 7 a lubricative layer.

The Tg (i.e., the glass transition temperature) of the polyester resin used in the present invention is not higher than 40° C., and preferably from −20° C. to 40° C., more preferably from −20° C. to 20° C. When Tg is higher than 40° C., the still durability of the magnetic layer is deteriorated because the magnetic layer tends to crack. When Tg is lower than −20° C., on the other hand, the blocking phenomenon tends to occur, resulting in failure to accomplish the effects intended by the present invention.

The polyester resin used in the present invention can have any of known structure. For instance, Vylonal 1400, Vylonal 1930 and Vylon 300 (manufactured by Toyobo Co., Ltd.) can be employed.

The polyester resin used in the present invention which have Tg of 40° C. or lower are not particularly restricted as to molecular weight since the molecular weight does not have a great influence on Tg. However, it is desirable that they have a weight average molecular weight of from about 5,000 to 25,000. Monomers which can constitute the polyester resin of the present invention are common ones, with specific examples including ethylene glycol, diethylene glycol, butanediol, neopentyl glycol, triethylene glycol, phthalic acid, adipic acid and the like.

Additionally, it is desirable that the polyester resin used in the present invention have an elongation at break of preferably 50% or more, more preferably 100% or more, and a breaking stress of preferably 0.2 Kg/m$^2$ or more, more preferably 0.5 Kg/m$^2$ or more.

Solvents which can be used for dissolving the polyester resin of the present invention include organic solvents known to be used for dissolving common binders, such as methyl ethyl ketone, cyclohexanone, toluene and the like. In choosing a solvent, however, it is necessary to take into account the coating properties of the resin to be dissolved therein.

The non-magnetic fine particles used in the present invention have an average particle size of 100 to 350 Å, preferably 150 to 350 Å, and more preferably 150 to 250 Å. The average particle size used herein refers to the value determined by the observation with SEM (scanning electron microscope) or TEM (transmission electron microscope).

The non-magnetic particles having an average particle size smaller than 100 Å are undesirable because they reduce running durability. Those having an average particle size of larger than 350 Å are also undesirable because the resulting magnetic layer inflicts a spacing loss on a magnetic head resulting in output drop.

The non-magnetic fine particles may be made of any material and may have any shape. However, they are preferably spherical inorganic fine particles, though the present invention should not be construed as being limited to these particles.

Suitable examples of inorganic fine particles include spherical silica, spherical carbon and so on, more specifically organosilica sol produced by Shokubai Kasei Co., Ltd.

The undercoating layer of the present invention can be formed by dispersing the foregoing polyester resin and non-magnetic fine particles in an organic solvent, such as those described above, to prepare a coating composition, coating the coating composition on a non-magnetic support according to a bar coating, a gravure coating or another conventional coating method, and then drying the coating composition.

The thickness of the undercoating layer is 30 to 250 Å, preferably 30 to 150 Å. The term "thickness" as used herein refers to the distance from the surface of the undercoating layer to the non-magnetic support in the area that non-magnetic fine particles are buried in a binder of the undercoating layer. In the area that the non-magnetic fine particles are partly exposed without being covered with a binder, it refers to the distance from the foot portion of each projected particle (i.e., protrusion) (i.e., from the surface of the binder which is not a top of the protrusion) to the non-magnetic support. In the present invention, it is desirable that a proportion of the particles present in the latter condition be not less than 50%, preferably not less than 70%, to the whole non-magnetic fine particles. The suitable height of the projected part of the particles, or the suitable distance from the top to the foot surface, ranges preferably from 50 to 300 Å, more preferably from 50 to 200 Å.

The amount of the non-magnetic fine particles in the horizontal plane of the undercoating layer ranges preferably from $1 \times 10^6$ to $30 \times 10^6$ pieces/mm$^2$, more preferably from $5 \times 10^6$ to $20 \times 10^6$ pieces/mm$^2$.

As for the proportion of the non-magnetic fine particles to the polyester resin to be blended therewith, it is proper that generally from 1 to 50 parts by weight, preferably from 1 to 10 parts by weight, of the non-magnetic fine particles are blended with 100 parts by weight of the polyester resin.

A magnetic layer can be provided on the undercoating layer coated on a non-magnetic support according to a known method. Examples of a method suitable for forming the magnetic layer include an electroplating method, a non-electrolytic plating method, a vapor plating method, a sputtering method, an evaporating method, an ion plating method and so on.

Since the constitution of the present invention consists in regulating the surface structure of the undercoating layer by specifying the size of the non-magnetic fine particles and the kind, Tg and amount of the binder, the surface roughness of the ferromagnetic metal thin film provided on the undercoating layer can be controlled depending on the surface structure of the undercoating layer. This mechanism for securing surface roughness is highly effective in improving running durability.

The shape of the surface of the magnetic layer is not particularly restricted. However, when the surface has projections having a height of generally 1 to 50 nm, preferably 1 to 30 nm, the resulting magnetic recording medium is excellent in running properties, durability and electromagnetic characteristics. The thickness of the magnetic layer, excluding the projected parts, ranges generally from 100 nm to 300 nm, preferably from 150 nm to 250 nm.

It is desirable for the magnetic recording medium of the present invention to have a protective/lubricative layer on the outer surface (i.e., the uppermost layer) of the magnetic layer, namely a ferromagnetic metal thin film. Herein, the term "a protective/lubricative layer" means a layer having at least either a protecting or a lubricating function.

In the present invention, any lubricant may be used for the protective/lubricative layer. Examples of a lubricant which can be used herein to a decided advantage include fluorine compounds which contain a polar group and belong to a class of perfluoropolyethers (which are called polar group-containing perfluoropolyethers, hereinafter) and/or fluorine compounds which contain a perfluoroalkyl group in at least one end of the molecule and have a polar group in the molecule (which are called (polar group-containing) fluorine compounds, hereinafter). These compounds can be used alone or in combination of two or more thereof. Although there are cases in which the polar group-containing perfluoropolyethers are the same as the above-defined fluorine compounds, the former compounds are characterized by the absence of hydrogen atoms bonded to the basic skeleton thereof, while the latter may include organic compounds containing hydrogen atoms bonded to carbon atoms.

Polar groups contained in the aforementioned polar group-containing perfluoropolyethers and fluorine compounds do not have any particular limitation. Concrete examples of polar groups include an oxo group, an oxoacid group, a sulfonic acid group, a sulfoxide group, a diphenyl ether group, an epoxy group, an alcoholic hydroxyl group, an ester group, a silane coupling group, an alkene group, a chelating group, a heterocyclyl group and so on.

Of these polar groups, an oxo group, a sulfonic acid group, a sulfoxide group and a diphenyl ether group are preferred over others.

Among such groups, especially preferred is an oxo group.

The term "an oxo group" as used herein is intended to include groups which contain oxygen atom(s) alone as atom(s) bonded directly to their respective central atoms, part or all of which is/are combined with hydrogen atom(s) to form hydroxyl group(s), and show an acidic character in an aqueous solution through dissociation of said hydroxyl group(s) to hydrogen ion(s) (according to the definition given, e.g., in *Rikagaku Jiten* (which means a "dictionary of physics and chemistry"), published by Iwanami Shoten). Additionally, those which contain a carbon atom attached to the central atom of a carboxylic acid, a sulfonic acid or the like are classified as derivatives of the above-defined oxo groups.

The term "an oxoacid group" as used herein is intended to include not only groups derived from oxoacids, or oxygen- or hydroxyl-containing inorganic acids, but also oxoacid derivatives, such as a carboxyl group, and oxoacid esters such as sulfuric acid esters.

The polar group-containing perfluoropolyethers and fluorine compounds are not particularly restricted as to the position and the number of their respective polar groups.

As for the way in which the polar group is attached to the foregoing perfluoropolyethers and fluorine compounds, another molecular chain such as an amide (linkage), a benzene (phenylene group), an alkylene group or so on may be present therebetween. Such a molecular chain may or may not be substituted with a fluorine atom in the former and the latter compounds.

As for the size of a perfluoropolyether which constitutes the main chain of the polar group-containing perfluoropolyethers, it is desirable for the perfluoropolyether to have 6 to 150 carbon atoms, particularly 9 to 50 carbon atoms.

When the number of carbon atoms contained in the perfluoropolyether is too small, the sliding properties of the resulting magnetic recording medium are unsatisfactory, so that a running property is deteriorated. When the number of carbon atoms therein is too large, on the other hand, the mobility of the molecule becomes great, so that fellow molecules block one another to increase adsorption difficulty. Therefore, even when the saturated surface coverage, or the saturated adsorption at the surface, is 4.0 mg/m$^2$ or more, the influence of this mobility is all the more likely to increase since it is necessary for the magnetic layer surface to be coated with the perfluoropolyethers described above in a short time. As a result thereof, there is an undesirable possibility of insufficient durability.

It is preferable for the molecular chain of the perfluoropolyethers to be straight, though it may be a branched chain. When the molecule has branches, it is desirable that the branches have two or less carbon atoms.

When the branched molecular chain is too large in size, the volume occupied by the molecule in the space becomes large, so that a minute protective layer cannot be formed and the orientation of the molecules becomes irregular. As a result, the anti-corrosion property is insufficient and the sliding properties deteriorates. Accordingly, too large branches are undesirable.

Specific examples of a polar group-containing perfluoropolyether include Compounds 1 to 8 shown below. Of course, compounds which can be used as the polar group-containing perfluoropolyethers in the present invention should not be construed as being limited to these examples.

Compounds containing an oxo group as a polar group:

Compound 1
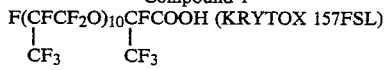
F(CFCF$_2$O)$_{10}$CFCOOH (KRYTOX 157FSL)
   |                  |
   CF$_3$            CF$_3$ Compound 2
F(CF$_2$CF$_2$CF$_2$O)$_{22}$CH$_2$CH$_2$COOH Compound 3
HOOCCF$_2$(OC$_2$F$_4$)$_{10}$(OCF$_2$)$_{10}$CF$_2$COOH Compound 4
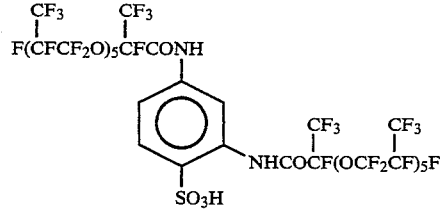
  CF$_3$    CF$_3$
    |        |
F(CFCF$_2$O)$_5$CFCONH
                    |
                   [phenyl ring]—NHCOCF(OCF$_2$CF)$_5$F
                    |                  |      |
                   SO$_3$H            CF$_3$  CF$_3$ Compound 5
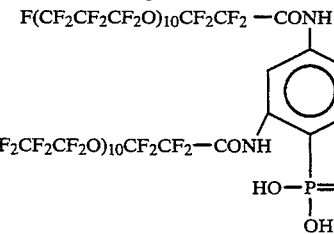
F(CF$_2$CF$_2$CF$_2$O)$_{10}$CF$_2$CF$_2$—CONH
                                          |
                                      [phenyl ring]
                                          |
F(CF$_2$CF$_2$CF$_2$O)$_{10}$CF$_2$CF$_2$—CONH
                                          |
                                       HO—P=O
                                          |
                                          OH Compounds containing sulfone, sulfoxide or diphenyl ether groups as a polar group:

Compound 6

Compounds containing sulfone, sulfoxide or diphenyl ether groups as a polar group:

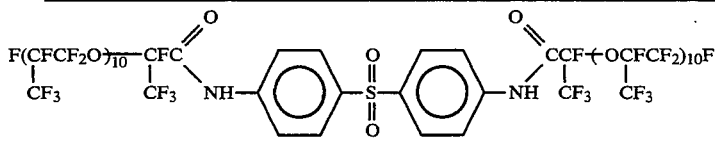

Compound 7

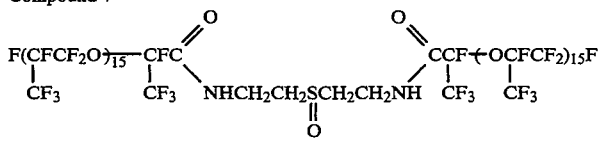

Compound 8

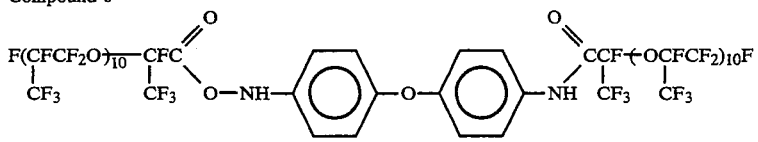

Compounds 1 to 3 are commercially produced by E. I. Du Pond de Nemours & Company (Inc.), Daikin Kogyo Co., Ltd. and Montecatini Soc. Gen.

The fluorine compounds used in the present invention may have any structure provided that they contain a perfluoroalkyl group bonded to at least one end of the molecule. An example of the basic skeleton structures of the fluorine compounds is illustrated below:

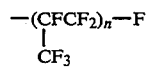

and as an illustration of the perfluoroalkyl groups thereof, $-C_nF_{2n+1}$ (n=3-18) can be given.

Specific examples of the fluorine compounds preferably used in the present invention are shown below.

$CF_3(CF_2)_7COOH$, $CF_3(CF_2)_7(CH_2)_{10}COOH$,
$CF_3(CF_2)_7(CH_2)_{10}OH$,
$CF_3(CF_2)_7COO(CH_2)_{17}CH_3$,
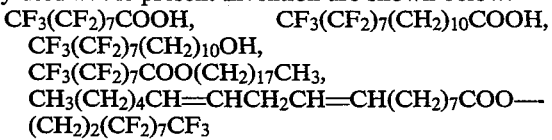

In the application to a ferromagnetic metal thin film surface of the present magnetic recording medium, it is desirable for the polar group-containing perfluoropolyethers to have a whole coverage (i.e., a whole coating amount) ranging from 4.0 to 40 mg/m$^2$ particularly from 10 to 30 mg/m$^2$, and a whole coverage/surface coverage (i.e., a whole coating amount/an amount adsorbed to the surface) ratio ranging from 1 to 3 by weight, particularly from 1 to 2 by weight.

The whole coverage used herein is a value determined by carrying out the quantitative analysis of fluorine present on the ferromagnetic metal thin film by means of an X-ray fluorometric analysis apparatus ("Model SXF-1000", produced by Shimazu Seisakusho Ltd.) after a sample of the present magnetic recording medium is prepared by coating the foregoing perfluoropolyether on the ferromagnetic metal thin film.

When the quantity of the polar group-containing perfluoropolyether applied to the surface of the ferromagnetic metal thin film (the whole coverage) is small, the protective/lubricative layer formed on the surface of the thin film cannot be made sturdy and minute, so that it cannot cope with corrosion problems, particularly salt damage, and is insufficient in durability.

On the other hand, when the whole coverage is too great, the coefficient of friction, especially at the time of slow running, becomes great, which tends to cause a sticking phenomenon or the like.

As for the fluorine compounds, the whole coverage thereof ranges generally from 1 to 40 mg/m$^2$, preferably from 5 to 20 mg/m$^2$, when they are used independently. On the other hand, when the fluorine compounds are used in combination with the polar group-containing perfluoropolyethers, the whole coverage can be properly determined by taking into account of the above-cited ranges.

The polar group-containing perfluoropolyethers and the fluorine compounds described above may be used together with other lubricants. Suitable examples of other lubricants include fatty acids, metallic soap, fatty acid amides, fatty acid esters, higher aliphatic alcohols, monoalkyl phosphates, dialkyl phosphates, trialkyl phosphates, paraffins, silicone oil, animal and vegetable oils, mineral oil, higher aliphatic amines; inorganic fine powders such as graphite, silica, molybdenum disulfide, tungsten disulfide, etc.; fine powders of resins such as polyethylene, polypropylene, polyvinyl chloride, ethylene-vinyl chloride copolymer, polytetrafluoroethylene, etc.; unsaturated aliphatic hydrocarbons which are liquid at ordinary temperatures; and so on.

The protective/lubricative layer of the present invention may comprise one or more layers.

The process of forming the protective/lubricative layer may comprise forming on a magnetic layer a protective layer made up of a resin and forming thereon a lubricative layer; mixing a resin and a lubricant, coating the mixture on a magnetic layer to form the protective/lubricative layer; forming a lubricative layer alone; and so on. More specifically, in one process, ingredients including at least one of the foregoing lubricants, a resin and so on are dissolved in an organic solvent, coated or sprayed on a magnetic layer, and then dried; in another process, a material impregnated with the ingredients is made to adhere to the magnetic layer by rubbing; in still another process, a magnetic recording medium is dipped in a solution prepared by dissolving the ingredients in an organic solvent to make the ingredients adsorb to the surface of the magnetic layer; and in a further process, a monomolecular layer of the ingredients is formed on a magnetic layer surface in accordance with Langmuir-Blodgett method or the like.

In addition, the surface of the ferromagnetic metal thin film can be modified in advance by means of UV irradiation, glow discharge, plasma or the like, for the purpose of heightening adhesiveness between the protective/lubricative layer and the metal thin film provided thereunder.

Specific examples of a material which can constitute the ferromagnetic metal thin film of the present invention include ferromagnetic metals such as iron, cobalt, nickel and so on, and ferromagnetic alloys such as Fe—Co, Fe—Ni, Co—Ni, Fe—Rh, Co—P, Co—B, Co—Y, Co—La, Co—Ce, Co—Pt, Co—Sm, Co—Mn, Co—Cr, Fe—Co—Ni, Co—Ni—P, Co—Ni—B, Co—Ni—Ag, Co—Ni—Nd, Co—Ni—Ce, Co—Ni—Zn, Co—Ni—Cu, Co—Ni—W, Co—Ni—Re and so on. The ferromagnetic metal thin film is preferably formed by an evaporation method. The thickness thereof generally ranges from 0.02 to 2 μm, and the range of 0.05 to 1.0 μm is particularly desirable.

The above-described ferromagnetic metal thin film may contain additionally O, N, Cr, Ga, As, St, Zr, Nb, Mo, Rh, Pd, Sn, Sb, Te, Pm, Re, Os, Ir, Au, Hg, Pb, Mg, Bi, etc.

The ferromagnetic metal thin film of the present magnetic recording medium is preferably formed on a non-magnetic support by the use of a vacuum film-formation technique such as vacuum deposition, sputtering or the like. In order to incorporate a prescribed quantity of oxygen into the ferromagnetic metal thin film, oxygen gas is admitted into the film-formation chamber simultaneously with the ferromagnetic metal vapor.

When the oxygen content in the ferromagnetic metal thin film is generally at least 15 atomic %, especially at least 20 atomic %, a desirable effect can be produced.

That is, when the oxygen content is below 15 atomic %, the saturated surface coverage (i.e., the saturated adsorption amount) of the lubricant constituting at least one polar group-containing perfluoropolyether or fluorine compound cannot be heightened, or even if it can be heightened the adsorption of the lubricant cannot be made firm. Accordingly, a satisfactory improvement in corrosion resistance and running properties cannot be produced.

On the other hand, when the oxygen content is more than 30 atomic %, the proportion of a non-magnetic component is increased, resulting in undesirable deterioration of the electromagnetic characteristics.

As for the oxygen distribution in the thickness direction of the ferromagnetic metal thin film, it is desirable that the oxygen content in the vicinity of the non-magnetic support and that in the vicinity of the magnetic layer surface is higher than that in the central part of the magnetic layer.

More specifically, the ferromagnetic metal thin film undergoes the AES (Auger electron spectroscopic) depth analysis, which is made by dividing the film in 5 equal sections in the thickness direction. Therein, the area corresponding to one-fifth of the whole thickness in the downward direction from the surface of the metal thin film is defined as the vicinity of the surface, while the area corresponding to one-fifth of the whole thickness in the upward direction from the interface between the non-magnetic support or undercoating layer and the ferromagnetic metal thin film is defined as the vicinity of the non-magnetic support. It is desirable for the oxygen distribution in the ferromagnetic metal thin film that an oxygen content in the central part of the areas other than the above-defined vicinities of the surface and the non-magnetic support be less than the total contents in the vicinities of the surface and the non-magnetic support.

More specifically, it is desirable that the oxygen content in the vicinity of the surface of the ferromagnetic metal thin film and that in the vicinity of the non-magnetic support are both at least 5 atomic % and the oxygen content in the central part is 3 to 4 atomic %.

The ferromagnetic metal thin film of the present invention has a crystal structure such as hexagonal crystals, rhombic columnar crystals or so on.

A structural characteristic of the rhombic columnar crystals is illustrated concretely, e.g., as crystal columns which lie obliquely one upon another to form a pattern like scales and are oriented in a shape such as pinecone.

The magnetic layer of the present invention may be constructed by two or more layers which differ from one another in crystal structure though they have the same composition, those which differ from one another in orientation though they have the same crystal structure, and/or those which differ from one another in composition whether or not they have the same crystal structure. However, it is desirable for reduction of the differences depending on the direction of head-running in electromagnetic characteristics and durability, and for lowering noise, that the magnetic layer be constructed by two layers which have the same composition and the same crystal structure, but wherein the inclination directions of the foregoing rhombic columnar crystals are different between the upper and lower layers and cross each other in reverse.

Formation of a magnetic layer constituting rhombic columnar crystals by the use of a vacuum film-formation technique can be performed in the present invention, e.g., wherein a 30 KeV of electron beam is used as a heat source for evaporation, the degree of vacuum in a chamber for film formation is adjusted to $1 \times 10^{-4}$ Torr or less, oxygen gas is admitted into the chamber as the pressure inside the chamber is maintained at $1 \times 10^{-3}$ Torr or less and a ferromagnetic metal is evaporated obliquely onto a non-magnetic support placed in the chamber at an incidence angle ranging from 0° to 50°.

For the purpose of giving a desired characteristic to the ferromagnetic metal thin film of the present invention, a non-magnetic interlayer having a function different from that of the present undercoating layer can be provided independently of said undercoating layer inside the ferromagnetic metal thin film or/and between the ferromagnetic metal thin film and the non-magnetic support. For instance, ingredients used for the foregoing protective/lubricative layer including a lubricant and so on are incorporated into this non-magnetic interlayer to control the sliding properties more surely, to bring about a further improvement in the mechanical characteristics of the magnetic layer, and so on.

The non-magnetic interlayer described above may constitute metal or metal oxide, a resin and/or an inorganic or organic filler, or so on. In addition, this interlayer may comprise the same materials as used in the present undercoating layer. The thickness of the non-magnetic interlayer ranges generally from 20 to 500 Å, preferably from 50 to 200 Å.

Suitable materials for the non-magnetic support in the present invention include plastics such as polyethylene terephthalate, polyimide, polyamide, polyvinyl chloride, cellulose triacetate, polycarbonate, polyethylene naphthalate, polyphenylene sulfide, etc., and metals such as Al, Ti, stainless steel, etc.

In particular, the adhesion force between the non-magnetic support and the magnetic layer made up of a ferromagnetic metal thin film can be markedly heightened by using a polyethylene terephthalate (abbreviated as PET, hereinafter) film as the non-magnetic support.

The proper thickness of the non-magnetic support, though depends on the end-use purpose of the magnetic recording medium, ranges generally from 3 to 50 μm.

Moreover, it is preferable to form fine projections (i.e., fine protrusions) made of a filler all over the surface of the non-magnetic support on the undercoating layer-forming side prior to the formation of the undercoating layer. The formation of fine projections results in reinforcing the function of the undercoating layer and can impart proper roughness to the magnetic layer surface. It is desirable that the abundance of the fine projections is $2 \times 10^6$ to $2 \times 10^8$ pieces per square millimeter and that the height thereof ranges from 1 to 50 nm. Additionally, the average particle size of the filler can be chosen from the range of generally 500 Å to 3,000 Å, preferably 500 Å to 1,500 Å.

The magnetic recording medium may be in any form, e.g., a tape, a sheet, a card, a disc, etc. However, it is especially preferable that the material be in the form of a tape or a disc.

With the intention of further enhancing running durability, the non-magnetic support can also be back-coated with a composition containing mainly non-magnetic particles and a binder resin on the side opposite the magnetic layer.

In a preferred embodiment of the present invention, the magnetic recording medium has on a polyethylene terephthalate (PET) support, in succession, an undercoating layer constituting polyester resin having a glass transition temperature (Tg) of not more than 40° C. and containing inorganic fine particles, a ferromagnetic metal thin film constituting Co—Ni—O or Co—O and formed by an evaporation technique, and a lubricative layer comprising a polar group-containing perfluoropolyether or a fluorine compound containing both perfluoroalkyl and polar groups.

An enlarged cross-sectional view of the above-described magnetic recording medium is schematically illustrated in FIG. 1. Therein, the numeral 1 designates the magnetic recording medium of the present invention, the numeral 2 a PET support, the numeral 3 a polyester resin having Tg of 40° C. or less, the numeral 4 a spherical silica particle having an average size of 100 to 250 Å, the numeral 5 a ferromagnetic metal thin film constituted of Co—Ni—O or Co—O, the numeral 6 a filler particle having an average size of 50 nm with which the support is filled in, and the numeral 7 a lubricative layer constituting a polar group-containing perfluoropolyether or a fluorine compound containing both perfluoroalkyl and polar groups.

The density of silica particles 4 ranges preferably from $5 \times 10^6$ to $20 \times 10^6$ pieces per mm². When the particles are beyond that upper limit, increase of noise is caused thereby; when they are decreased in number the running properties deteriorate. The average size of the silica particles ranges preferably from 100 to 200 Å. When silica particles have an average size greater than that upper limit, a drop in output is caused due to spacing loss; when they have an average size smaller than that lower limit, the running properties deteriorate.

The polyester resin 3 strengthens adhesion between the ferromagnetic metal thin film and the PET support and, at the same time, disperses the stress generated between the magnetic layer and the support. Owing to these functions, it can increase the elongation at the point in time when the medium is extended up to its breaking point in the longitudinal direction (i.e., in the longer direction), and can render cracks minute. It is desirable for this polyester resin to have Tg of 40° C. or less. When the Tg is more than 40° C., sufficient dispersion of the stress cannot be achieved, so that neither elongation described above nor shape of the cracks are improved. Further, it is desirable that the thickness of the undercoating layer ($T_1$) be in the range of 30 to 150 Å. When the thickness is greater than 150 Å, the binder of the undercoating layer tends to adhere to the back of the support when the undercoating layer coated on the support is rolled up. On the other hand, the undercoating layer thinner than 30 Å cannot have the above-described characteristics.

The ferromagnetic metal thin film 5 is a Co—Ni—O or Co—O type ferromagnetic thin film formed with a continuous roll-up type evaporation apparatus. The thickness thereof ($T_2$) ranges preferably from 150 to 250 nm.

The lubricative layer 7 constitutes a polar group containing perfluoropolyether or a fluorine compound containing both perfluoroalkyl and polar groups. Suitable examples of the polar group which can be contained therein include carboxyl group, a sulfonyl group, a hydroxyl group and the like.

The present invention will now be illustrated in greater detail by reference to the following examples. However, the invention should not be construed as being limited to these examples.

EXAMPLE 1

On a 10 μm-thick polyethylene terephthalate film base containing inside thereof filler particles having an average particle size of 500 Å, a dispersion obtained by dispersing into cyclohexanone silica fine particles having an average particle size of 230 Å (organosilica sol produced by Shokubai Kasei K. K.) and a polyester resin having a glass transition temperature of 4° C. ("Vylonal 1400", produced by Toyobo Co., Ltd.) was coated to form an undercoating layer having a particle density of $9 \times 10^6$ pieces per mm² and a thickness $T_1$ (as shown in FIG. 1) of 50 Å.

Onto the undercoating layer was evaporated obliquely a Co—Ni (80:20) alloy, with oxygen gas being introduced thereinto, by means of a continuous roll-up type evaporation apparatus. Thus, a ferromagnetic film having a thickness ($T_2$)i (as shown in FIG. 1) of 200 nm was formed.

On the thus formed film was coated a solution of a perfluoropolyether containing a carboxyl group as a polar group ("KRYTOX 157FSL", manufactured by Du Pont Co., Ltd.: Compound 1 illustrated hereinabove) dissolved in a fluorine-containing solvent ("FOMBLIN ZS100", manufactured by Montedison Co., Ltd.) in a concentration of 0.5 wt %, thus forming a lubricative layer. Example 1 was carried out two times as Example 1 (1) and Example 1 (2).

EXAMPLE 2

On a 10 μm-thick polyethylene terephthalate film base containing inside thereof filler particles having an average particle size of 500 Å and having on the surface wale-form protrusions, a dispersion containing silica fine particles having an average particle size of 230 Å and a polyester resin having a glass transition temperature of 20° C. ("Staffix", produced by Fuji Photo Film Co., Ltd.) in cyclohexanone was coated to form an undercoating layer having a particle density of $9 \times 10^6$ pieces per $mm^2$ and a thickness of 50 Å. Thereon, a magnetic layer and a lubricative layer were formed in the same manner as in Example 1.

Comparative Example 1

On a 10 μm-thick polyethylene terephthalate film base containing inside thereof filler particles having an average particle size of 500 Å and having on the surface wale-form protrusions, a dispersion containing silica fine particles having an average particle size of 230 Å and a polyester resin having a glass transition temperature of 70° C. ("Vylon 200", produced by Toyobo Co., Ltd.) in cyclohexanone was coated to form an undercoating layer having a particle density of $9 \times 10^6$ pieces per $mm^2$ and a thickness of 50 Å. Thereon, a magnetic layer and a lubricative layer were formed in the same manner as in Example 1.

Comparative Example 2

On a 10 μm-thick polyethylene terephthalate film base containing inside thereof filler particles having an average particle size of 500 Å, a dispersion containing silica fine particles having an average particle size of 230 Å and a polyester resin having a glass transition temperature of 20° C. ("Staffix", produced by Fuji Photo Film Co., Ltd.) in cyclohexanone was coated to form an undercoating layer having a particle density of $9 \times 10^6$ pieces per $mm^2$ and a thickness of 300 Å. Thereon, a magnetic layer and a lubricative layer were formed in the same manner as in Example 1.

Comparative Example 3

A magnetic recording medium was prepared in the same manner as in Example 1, except that a 10 μm-thick polyethylene terephthalate film having wale-form protrusions and containing silica particles having an average particle size of 250 Å and a density of $9 \times 10^6$ pieces per $mm^2$ was used in place of a support base provided with the undercoating layer according to the present invention.

Evaluation of Physical Properties

In the course of the preparation of sample tapes described above, each undercoating layer was subjected to surface observation (blocking test). The prepared sample tapes were examined for coefficients of friction against a stainless VTR guide pole and a pole made from POM (polyoxymethylene; a material for a tape guide used in VTR), breaking load, cracks and still durability by carrying out the following experiments respectively. The results obtained are shown in Table 1.

1. Blocking Phenomenon

The surface of each undercoating layer was observed with SEM and examined to determine whether a change was caused in minute shape of the surface.

2. Coefficient of Friction (against SUS):

Each sample tape which was slit to a width of 8 mm was brought into contact with a SUS pole at a winding angle of 180° as it was tightened with a tension ($T_1$) of 20 g under the circumstances of 23° C.-70% RH. Under this condition, the tension required to make each sample tape run at a speed of 14 mm/sec ($T_2$) was measured. On the basis of the thus obtained data, the coefficient of friction ($\mu$) was calculated from the following equation:

$$\mu = (1/\pi) \cdot ln(T_2/T_1)$$

As the value for evaluation, there was adopted the data obtained when each sample tape finished the 100th passage in the forward-and-backward running with an amplitude of 45 mm.

3. Coefficient of Friction (against POM)

Each sample tape which was slit to a width of 8 mm was brought into contact with a POM pole at a winding angle of 180° as it was tightened with a tension ($T_1$) of 20 g under the circumstances of 23° C.-10% RH. Under this condition, the tension required to make each sample tape run at a speed of 3 mm/sec ($T_2$) was measured. On the basis of the thus obtained data, the coefficient of friction ($\mu$) was calculated from the following equation:

$$\mu = (1/\pi) \cdot ln(T_2/T_1)$$

As the value for evaluation, there was adopted the data obtained when each sample tape finished the first passage in the forward-and-backward running with an amplitude of 100 mm.

4. Breaking Load

While the surface of each sample tape cut in a width of 8 mm was observed under a microscope, the tape was slowly stretched out in the longitudinal direction (i.e., in the longer direction). Therein, the tension measured at the time when the tape had the first crack in it was defined as the breaking load.

5. Cracks

After the first crack was generated in each sample tape, the tape was further stretched out by 0.3%. The length of the thus generated crack was taken as a criterion for the evaluation. More specifically, a good mark "G" was given to minute cracks having a length shorter than 50 μm, a bad mark "B" to large cracks having a length longer than 100 μm, and a so-so mark "M" to cracks having their length between the above-cited lengths.

6. Still Durability

Under the conditions of 23° C.-10% RH, the data was obtained by reproducing an image using an 8 mm-type VTR ("model FUJIFIX M6", made by Fuji Photo Film Co., Ltd.), from which a function of controlling the still reproduction time was removed in advance, as a running tension of 20 g was applied to each sample tape cut in a width of 8 mm and a length of 5 m; pressing the pause button, with the image being reproduced on TV; and measuring the time at which the TV image disappeared.

Evaluation of Running Properties

Each sample tape having a length corresponding to 120 minutes running was subjected to a running operation repeated 50 times using the same 8 mm-type VTR as described above under the conditions of 23° C.-10% RH, and evaluated with respect to the following properties.

7. Jitter

Color bar was recorded, and the reproduced image thereof was observed with a monitor. Therein, a bad mark "B" was given when it was confirmed by visual observation that the image reproduced on the monitor screen was waving all the time, a good mark "G" when it was confirmed that the reproduced image scarcely waved, and a so-so mark "M" when waving was sometimes confirmed.

8. Stop of Running

Each sample tape having a length corresponding to 120 minutes running was examined with an 8 mm-type VTR (model "EV-C10", made by SONY Corp.) as to whether or not the stop of running occurred during the running operation repeated 50 times.

9. Complete Head Clogging

In the running test that each sample tape having a length corresponding to 120 minutes running was subjected to the running operation repeated 50 times using an 8 mm-type VTR (model, "EV-C10", made by SONY Corp.), the term "complete head clogging" was used for expressing the state that a drop of −6 dB in output continued for 1 minute or more, and evaluated with the number of passages the sample tape had until it fell into said state.

10. Momentary Head Clogging

The term "momentary head clogging" is expressed in terms of the frequency of occurrence of the state that a drop of −6 dB in output continued for 5 msec during the running operation repeated 50 times using an 8 mm-type VTR (model, "EV-C10", made by SONY Corp.).

11. Head-Staining

The magnetic head was detached from the VTR after the same running operation as described above, and the surface thereof was observed under an optical microscope. Therein, a good mark "G" was when no stain was observed on the head, while a bad mark "B" was given when a stain was observed on the head.

nomenon because the undercoating layer thereof was thick and, what was worse, it was inferior in breaking load (i.e., breaking strength) and running durability. Additionally, the sample tape prepared in Comparative Example 3, which had no undercoating layer, suffered from the cracking phenomenon.

Therefore, the present invention results in extreme improvements in running properties and durabilities of the magnetic recording medium having the above constitution of the present invention.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support having an undercoating layer provided on said non-magnetic support and a magnetic layer provided on said undercoating layer, wherein said undercoating layer provided between said non-magnetic support and said magnetic layer comprises mainly non-magnetic fine particles having an average particle size of 100 to 350 Å and a binder, wherein said binder is a polyester resin having a glass transition temperature of 40° C. or less, said undercoating layer has a thickness of 30 to 250 Å, and said magnetic layer is a ferromagnetic metal thin film.

2. The magnetic recording medium as in claim 1, further comprising a protective/lubricative layer on said magnetic layer, said protective/lubricative layer

TABLE 1

|  | Example 1 (1) | Example 1 (2) | Example 2 | Comparative Example 1 | Comparative Example 2 | Comparative Example 3 |
| --- | --- | --- | --- | --- | --- | --- |
| Average Particle Size (Å) of Non-magnetic Fine Particles | 230 | 230 | 230 | 230 | 230 | 250 (inside support base: no undercoating layer) |
| Glass Transition Temperature ($T_g$; °C.) of Polyester Resin | 40 | 40 | 20 | 70 | 20 | |
| Thickness ($T_1$; Å) of Undercoating Layer | 50 | 50 | 50 | 50 | 300 | |
| Blocking | did not occur | did not occur | did not occur | did not occur | occurred | did not occur |
| Coefficient of Friction (against SUS) | 0.24 | 0.24 | 0.25 | 0.24 | 0.24 | 0.27 |
| Coefficient of Friction (against POM) | 0.30 | 0.30 | 0.32 | — | — | 0.43 |
| Breaking Load (g) | 210 | 210 | 270 | 220 | 190 | 200 |
| Cracks | G | G | G | B | B | B |
| Still Durability (minute) | 30 or more | 30 or more | 30 or more | 5 | 20 | 30 or more |
| Jitter | good | good | good | good | not measured | bad |
| Stop of Running | did not occur | did not occur | did not occur | did not occur | not measured | did not occur |
| Complete Head Clogging | did not occur | did not occur | did not occur | 32th passage | not measured | 38th passage |
| Momentary Head Clogging (Frequency of occurrence/hour) | 0.01 | 0.04 | 0.06 | 0.14 | not measured | 0.15 |
| Head-Staining | G | G | G | B | not measured | B |

As is apparent from the results of Table 1, the sample tapes prepared in accordance with the present invention exhibited excellent characteristics in all evaluation tests. That is, the present magnetic recording medium proved to be free from blocking and cracking phenomena and to have improved still durability and running durability. On the other hand, the sample tape prepared in Comparative Example 1 had cracks and poor running durability because the binder used in its undercoating layer had a high Tg of 70° C., and the sample tape prepared in Comparative Example 2 caused the blocking phecomprising a polar group-containing perfluoropolyether, and/or a polar group-containing fluorine compound having a perfluoroalkyl group located at at least one terminal thereof.

3. The magnetic recording medium as in claim 1, wherein said non-magnetic fine particle is a spherical inorganic fine particle.

4. The magnetic recording medium as in claim 1, wherein said non-magnetic fine particle is contained in said undercoating layer in an amount of 1 to 50 parts by weight per 100 parts by weight of the polyester resin.

5. The magnetic recording medium as in claim 1, wherein the non-magnetic fine particles have an average particle size of 150 to 350 Å.

6. The magnetic recording medium as in claim 1, wherein said polyester resin has a weight average molecular weight of about 5,000 to 25,000.

7. The magnetic recording medium as in claim 1, wherein said polyester resin has a glass transition temperature of −20° C. to 40° C.

8. The magnetic recording medium as in claim 1, wherein said undercoating layer has a thickness of 30 to 150 Å.

9. The magnetic recording medium as in claim 1, wherein said ferromagnetic metal thin film comprises iron, cobalt, nickel or ferromagnetic alloy.

10. The magnetic recording medium as in claim 1, wherein said magnetic layer has a thickness of 0.02 to 2 μm.

11. The magnetic recording medium as in claim 3, wherein said spherical inorganic fine particle is spherical silica or spherical carbon.

12. The magnetic recording medium as in claim 4, wherein said non-magnetic fine particle is contained in said undercoating layer in an amount of 1 to 10 parts by weight per 100 parts by weight of the polyester resin.

13. The magnetic recording medium as in claim 11, wherein said spherical silica is an organosilica sol.

14. The magnetic recording medium as in claim 5, wherein the non-magnetic fine particles have an average particle size of 150 to 250 Å.

15. The magnetic recording medium as in claim 7, wherein said polyester resin has a glass transition temperature of −20° C. to 20° C.

16. The magnetic recording medium as in claim 9, wherein said ferromagnetic alloy is Fe—Co, Fe—Ni, Co—Ni, Fe—Rh, Co—P, Co—B, Co—Y, Co—La, Co—Ce, Co—Pt, Co—Sm, Co—Mn, Co—Cr, Fe—Co—Ni, Co—Ni—P, Co—Ni—B, Co—Ni—Ag, Co—Ni—Nd, Co—Ni—Ce, Co—Ni—Zn, Co—Ni—Cu, Co—Ni—W or Co—Ni—Re.

17. The magnetic recording medium as in claim 10, wherein said magnetic layer has a thickness of 0.05 to 1.0 μm.

* * * * *